United States Patent
Zhang

(10) Patent No.: US 10,738,241 B2
(45) Date of Patent: Aug. 11, 2020

(54) RESIN COMPOSITION, CURED PHOTORESIST AND DISPLAY PANEL

(71) Applicant: SHENZHEN CHINA STAR OPTOELECTRONICS TECHNOLOGY CO., LTD., Shenzhen (CN)

(72) Inventor: Xia Zhang, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 22 days.

(21) Appl. No.: 16/033,238

(22) Filed: Jul. 12, 2018

(65) Prior Publication Data

US 2019/0225885 A1 Jul. 25, 2019

Related U.S. Application Data

(63) Continuation of application No. PCT/CN2018/077100, filed on Feb. 24, 2018.

(30) Foreign Application Priority Data

Jan. 23, 2018 (CN) .......................... 2018 1 0067121

(51) Int. Cl.
*C09K 19/54* (2006.01)
*C08L 33/08* (2006.01)
(Continued)

(52) U.S. Cl.
CPC .............. *C09K 19/542* (2013.01); *C08F 2/48* (2013.01); *C08F 265/06* (2013.01); *C08L 33/04* (2013.01);
(Continued)

(58) Field of Classification Search
CPC ....... C09K 19/542; C08L 33/08; C08L 33/04; C08F 222/10; C08F 222/06; C08F 2/48; C08F 266/06
See application file for complete search history.

(56) References Cited

U.S. PATENT DOCUMENTS 4,675,274 A * 6/1987 Ueda ........................ G03C 5/50
430/379
4,842,987 A * 6/1989 Elzer ....................... G03F 7/033
204/157.15
(Continued)

FOREIGN PATENT DOCUMENTS

CN 101154039 A 4/2008
CN 102236256 A 11/2011
(Continued)

*Primary Examiner* — Sanza L. McClendon

(57) ABSTRACT

The present disclosure provides a resin composition, a cured photoresist and a display panel. The resin composition includes an initiator, at least one multifunctional monomer, a resin, a solvent, and an agent; wherein the multifunctional monomer comprises a monomer compound with the secondary amine group. Through the above-mentioned method, the present disclosure can realize the low-temperature curing of a photoresist, and can further reduce the phenomenon of high-temperature yellowing of the organic flat layer material during the subsequent curing process, and the high-temperature deformation of the substrate can be avoided in the application of flexible displays.

17 Claims, 2 Drawing Sheets

(51) Int. Cl.
*C08F 2/48* (2006.01)
*C08L 33/04* (2006.01)
*C08F 265/06* (2006.01)

(52) U.S. Cl.
CPC ........... *C08L 33/08* (2013.01); *C08L 2203/20* (2013.01); *C08L 2205/025* (2013.01); *C09K 2019/548* (2013.01)

(56) References Cited

U.S. PATENT DOCUMENTS

| | | | | |
|---|---|---|---|---|
| 5,073,478 | A * | 12/1991 | Banks | G03F 7/0384 204/478 |
| 5,212,043 | A * | 5/1993 | Yamamoto | G03F 7/012 430/165 |
| 5,246,816 | A * | 9/1993 | Yamasita | G03F 7/0388 204/499 |
| 5,770,347 | A * | 6/1998 | Saitoh | G03F 7/033 430/280.1 |
| 5,861,232 | A * | 1/1999 | Kanda | G03F 7/033 430/281.1 |
| 6,673,511 | B1 * | 1/2004 | Hatakeyama | G03F 7/0045 430/270.1 |
| 2002/0193622 | A1 * | 12/2002 | Watanabe | C07C 229/12 560/170 |
| 2018/0015697 | A1 * | 1/2018 | Ichiki | B32B 15/08 |

FOREIGN PATENT DOCUMENTS

| | | | | |
|---|---|---|---|---|
| JP | 2003131378 A | 5/2003 | | |
| TW | 201527876 A | 7/2015 | | |
| WO | WO-2016159136 A1 * | 10/2016 | | B32B 15/08 |

* cited by examiner

RESIN COMPOSITION, CURED PHOTORESIST AND DISPLAY PANEL

CROSS-REFERENCE TO RELATED APPLICATIONS

The present application is a continuation-application of International Application PCT/CN2018/077100, with an international filing date of Feb. 24, 2018, which claims foreign priority of Chinese Patent Application No. 201810067121.6, filed on Jan. 23, 2018 in the State Intellectual Property Office of China, the contents of all of which are hereby incorporated by reference.

TECHNICAL FIELD

Embodiments of the present disclosure generally relate to display manufacturing technology, and in particular to a resin composition, a cured photoresist and a display panel.

BACKGROUND

At present, for the mainstream thin film transistor liquid crystal display (TFT-LCD) high-end products, an Polymer Film on Array Layer (PFA) has been set on the array substrate side to reduce the topographic difference, thereby for improving the alignment effect of liquid crystals and reducing parasitic capacitance simultaneously, and the effect of curved surface display can be enhanced by using photo spacer (PS) on array technology. However, during the high-temperature heat curing process of the photo spacer (PS), the Polymer Film on Array Layer material is liable to yellowing which affects the chroma and the panel color gamut performance. At present, the main solution is to adjust the material of the Polymer Film on Array Layer and improve its extreme chroma performance. However, its formulas have a long adjustment time and are difficult to develop. Therefore, the low-temperature requirement in the post process is particularly important.

The studies about low-temperature resin compositions have received a certain attentions. In the prior art, the photoresists which can be cured at a low temperature of 20-90° C. can be manufactured by using a highly reactive acrylate monomer mixed with resin, pigment, and initiator. Researches and developments focus on the monomers with multifunctional groups so as to increase the reaction rate. However, the improvement to the reaction rate of the photoresists is quite limited by only adjusting the functional groups of the monomers.

SUMMARY

The present disclosure provides a resin composition, a cured photoresist and a display panel, which are capable of realizing the low-temperature curing of a photoresist, and can further reduce the phenomenon of high-temperature yellowing of the organic flat layer material during the subsequent curing process, and can avoid the high-temperature deformation of the substrate when it is applied in the flexible displays.

In order to solve the above-mentioned technical problems, one technical solution adopted in the present disclosure is to provide a cured photoresist. The cured photoresist is formed by curing a resin composition with light at low temperature, the resin composition comprises an initiator, at least one multifunctional monomer, a resin, a solvent, and an agent; where the multifunctional monomer includes a monomer compound with a secondary amine group.

In order to solve the above-mentioned technical problems, another technical solution adopted in the present disclosure is to provide a resin composition. The resin composition includes an initiator, at least one multifunctional monomer, a resin, a solvent, and an agent; where the multifunctional monomer includes a monomer compound with a secondary amine group.

In order to solve the above-mentioned technical problems, still another technical solution adopted in the present disclosure is to provide a display panel. The display panel comprises a cured photoresist, the cured photoresist is formed by performing light curing on a resin composition at low temperature; where the resin composition includes an initiator, at least one multifunctional monomer, a resin, a solvent, and an agent; where the multifunctional monomer includes a monomer compound having a secondary amine group.

The present disclosure provides a resin composition, a cured photoresist and a display panel. By using at least one monomer with a functional group as the monomer of a resin composition, the low-temperature curing of a photoresist can be realized, the phenomenon of high-temperature yellowing of the organic flat layer material during the subsequent curing process can be further reduced, and the high-temperature deformation of the substrate can be avoided when it is applied in the flexible displays.

DETAILED DESCRIPTION

Figure 1:
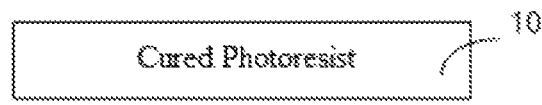
FIG. 1 is a schematic diagram of a cured photoresist according to an embodiment of the present disclosure.

The following will clearly and completely describe the technical solutions in the embodiments of the present disclosure with reference to the accompanying drawings in the embodiments of the present disclosure. It is to be understood that the specific embodiments described herein are only used to explain the present disclosure and are not intended to limit the present disclosure. It's obvious that only part but not all of the embodiments related to the present disclosure are provided. All other embodiments obtained based on the embodiments of the present disclosure by those skilled in the art without making creative efforts shall fall within the protection scope of the present disclosure.

A low-temperature resin composition provided in the embodiments of the present disclosure may specifically include the following components: an initiator, at least one multifunctional monomer, a resin, a solvent, and an agent, where the multifunctional monomer may include a monomer compound with a secondary amine group (—NH).

Optionally, the total weight of the solid content of the resin composition can be 100 wt %. The content of the multifunctional monomer can be 3-16 wt %, and specifically, it may be 3 wt %, 9.5 wt %, 16 wt %, or the like. In the present disclosure, the monomer compound with the secondary amine group (—NH) can be one or a combination of amide diene, secondary amine diene, secondary amine acrylate, and an acrylic monomer compound containing isocyanate.

The structural formula of the amide diene can be:

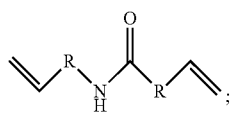

and the structural formula of the secondary amine acrylate can be:

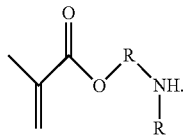

In an application scenario of the present disclosure, the monomer compound with the secondary amine group may specifically be 2,2,6,6-tetramethylpiperidine-4-methacrylate (TMPM), which may have the structural formula of:

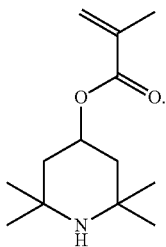

Furthermore, the structural formula of the acrylic monomer compound containing isocyanate can be:

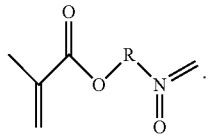

Optionally, in this embodiment, the multifunctional monomer of the resin composition can further include an acrylic monomer compound. In a specific embodiment, the acrylic monomer compound may be a polyhydric alcohol acrylate monomer compound containing an unsaturated double bond.

In an application scenario of the present disclosure, the amide diene can be used as the monomer compound with the secondary amine group (—NH), and the polyhydric alcohol acrylate monomer compound containing the unsaturated double bond can be used as the acrylic monomer compound, while the ratio of the monomer compound with the secondary amine group to the acrylic monomer compound may be 1:99-80:20, and specifically, it may be 1:99, 75:25, 80:20, or the like. In this embodiment, the ratio of the two (the monomer compound having the secondary amine group and the acrylic monomer compound) may be 10:90.

The amide diene can be prepared by a known acid amine condensation method. From the viewpoint of easier control, the polycondensation of the olefin amine and the olefin carboxylic acid can be used, and the reaction formula can be as follows:

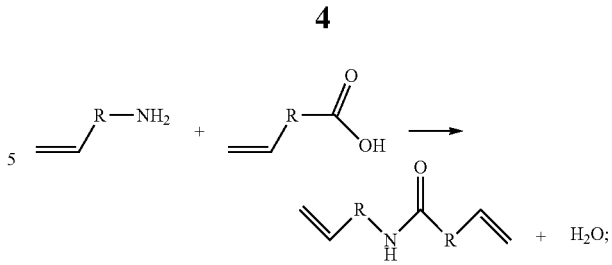

The preparation method can be as follows.

Under ice bath conditions, the raw material of olefin carboxylic acid could be dissolved in dry DMF (N,N-dimethylformamide), and 1.5eq of 1-hydroxybenzotriazole (HOBt) as condensing agent may be added. Then 1.2eq of olefin amine compound can be added. After the container is closed, the mixture may be first stirred at low temperature for 1 hour, and then stirred at room temperature for 0.5-24 hours. After stirring, saturated sodium bicarbonate (NaHCO$_3$) solution may be added to stop the reaction, and then ethyl acetate can be used to extract and obtain a diolefin compound with the secondary amine group (—NH).

In other embodiments, dichloromethane (DCM), toluene, or the like can also be used as the solvent for the preparation of the above-mentioned amide diene. The condensing agent may also be one of N,N-diisopropylethylamine (DIPEA), 1-ethyl-3-(3-dimethylaminopropyl) carbodiimide (EDC) and triethylamine (TEA), which is not further limited herein.

In this embodiment, since the amide diene may be an olefin monomer with the secondary amino group, the curing reaction may be accelerated. Furthermore, since the polyhydric alcohol acrylate monomer compound may contain an unsaturated double bond, and can participate in cross-linking reaction, curing by baking at a low temperature of 80° C.-180° C. can be realized after the resin composition is developed by light. The low temperature can specifically be 80° C., 130° C., 180° C., or the like, which is not further limited herein.

In other embodiments, the monomer compound with the secondary amine group can be utilized along as the monomer of the present disclosure. Alternatively, the monomer compound with the acrylic acid may be utilized along as the monomer of the present disclosure, which is not further limited herein.

Furthermore, the total weight of the solid content of the resin composition can be 100 wt %. The weight percentage of the initiator in the resin composition can be 0.5-4 wt %, and specifically, it may be 0.5 wt %, 2.25 wt %, 4 wt %, or the like, which is not further limited herein. Optionally, the initiator may include but not limited to at least one of an acetophenone compound, an imidazole compound, a benzophenone compound, and a benzoin compound. That may be, in a specific embodiment, the initiator may be selected from one or a combination of the above listed compounds.

Furthermore, the weight percentage of the resin in the resin composition may be 3-16 wt %, and specifically, it may be 3 wt %, 9.5 wt %, 16 wt %, or the like, which is not further limited herein. Optionally, polyacrylic resin may be used as the resin in the present disclosure, and may specifically include but is not limited to one of polymethyl acrylate, polyethyl acrylate, polypropyl acrylate, polybutyl acrylate, polypentyl acrylate, polyhexyl acrylate, and polyacrylic acid-ethyl-hexyl ester.

Common solvents with a boiling point less than 180° C. can be utilized as the solvent. In this embodiment, the weight percentage of the solvent in the resin composition may be 50-90 wt %, and specifically, it may be 50 wt %, 70 wt %, 90 wt %, or the like, which is not further limited herein. Optionally, the solvent in the present disclosure may include, but may not be limited to, cyclohexanone with a boiling point of 155.65° C., propylene glycol methyl ether acetate (PGMEA) with a boiling point of 149° C., ethyl 3-ethoxypropionate (EEP) with a boiling point of 166.2° C., diglyme with a boiling point of 159.76° C.

In this embodiment, the weight percentage of the agent in the resin composition may be 0.3-2 wt %, and specifically, it may be 0.30 wt %, 1.15 wt %, 2 wt %, or the like, which is not further limited herein. In a specific embodiment, the agent may include an attachment agent and a leveling agent. In which, the attachment agent may be a silane coupling agent, which may specifically include carbamate silane, vinyl silane, isocyanatosilane, epoxy silane, (meth)acryl silane, aldiminosilane, or the like. In other embodiments, it may also be an oligomer form of the above-mentioned alkanes, which is not further limited herein. Optionally the leveling agent may include surfactants, organic solvents or the like, which is not further limited herein.

The following may briefly describe the basic photoreaction mechanism of the amide diene in the resin composition.

In this embodiment, when being illuminated with light, the initiator may be split into two free radicals R':

(1)

The amide diene monomer may be excited by the free radicals and radical transfer may occur:

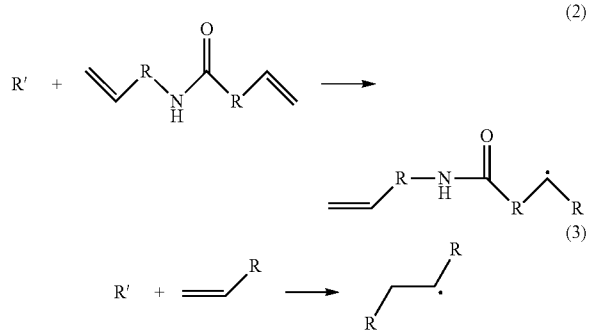
(2)

(3)

The monomers and the monomers excited by the free radicals may collide, and the chain may grow to form a net structure:

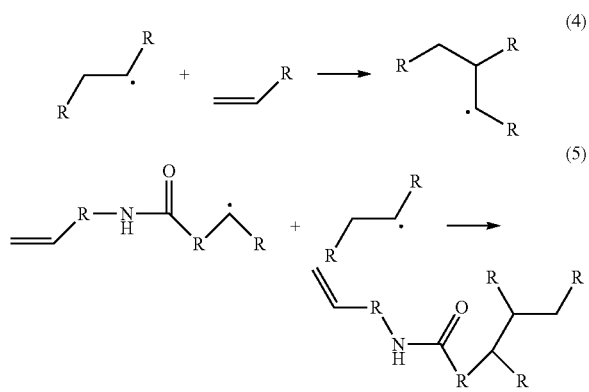
(4)

(5)

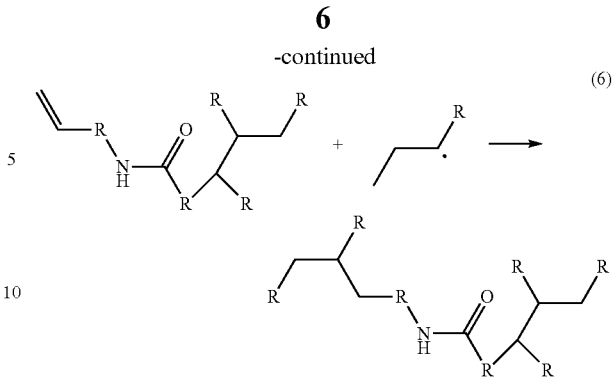
(6)

It can be seen from the above-mentioned reaction principle that, due to the addition of an olefin monomer with the secondary amine group (—NH), the initiation rate of the free radical may be accelerated. Thus, the curing by baking at a low temperature of 80° C.-180° C. can be realized after the resin composition is developed with light. Therefore the phenomenon of high-temperature yellowing of the organic flat layer material during the subsequent curing process may be alleviated.

In the above-mentioned embodiment, the low-temperature curing of a photoresist can be realized by using at least one monomer having a functional group as the monomer of a resin composition. Thus, the phenomenon of high-temperature yellowing of the organic flat layer material during the subsequent curing process can be further alleviated, and the high-temperature deformation of the substrate can be avoided when it is applied in flexible displays.

Referring to FIG. 1, a schematic diagram of a cured photoresist according to an embodiment of the present disclosure can be depicted. A cured photoresist 10 provided in the present disclosure may be formed by curing the resin composition which has been illuminated with light at low temperature according to above-mentioned embodiments. The specific composition of the resin composition has been described above and will not be described herein. After being developed with light, the resin composition may be baked and cured at a low temperature of 80° C.-180° C. Thus, the phenomenon of high-temperature yellowing of the organic flat layer material during the subsequent curing process can be further alleviated, and the high-temperature deformation of the substrate can be avoided when it is applied in flexible displays.

Figure 2:
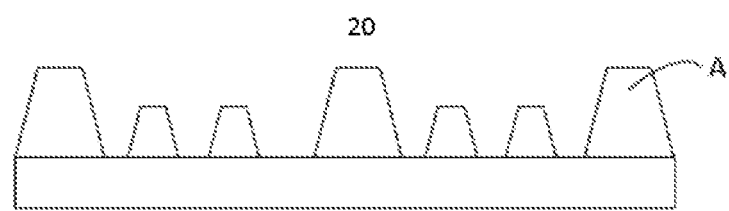
FIG. 2 is a schematic diagram of a display panel according to an embodiment of the present disclosure.

Referring to FIG. 2, a schematic diagram of a display panel according to an embodiment of the present disclosure may be depicted. A display panel 20 provided in the present disclosure may include a cured photoresist A of any one of above-mentioned embodiments. Since the cured photoresist A may be added with a monomer compound with a secondary amine group, the resin composition may be cured at low temperature because of the nucleophilic effect of the secondary amine group during the light reaction process. Therefore, the effect and risk of yellowing of the organic flat layer material during the subsequent high temperature heat curing process may be alleviated or reduced.

In summary, those skilled in the art can easily understand that the present disclosure may provide a resin composition cured photoresist and a display panel, in which the low-temperature curing of a photoresist can be realized by using at least one monomer having a functional group as the monomer of a resin composition, the phenomenon of high-temperature yellowing of the organic flat layer material during the subsequent curing process can be further reduced, and the high-temperature deformation of the substrate can be avoided when it is applied in flexible displays.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A cured photoresist, wherein the cured photoresist is formed by curing a resin composition with light at low temperature, the resin composition comprises an initiator, at least one multifunctional monomer, a resin, a solvent, and an agent, wherein
the multifunctional monomer comprises a monomer compound with a secondary amine group; and
wherein, the monomer compound with the secondary amine group is one or a combination of amide diene, secondary amine diene, secondary amine acrylate, and an acrylic monomer compound containing an isocyanate.

2. The cured photoresist of claim 1, wherein the monomer compound with the secondary amine group is amide diene.

3. The cured photoresist of claim 1, wherein the multifunctional monomer further comprises an acrylic monomer compound, and the acrylic monomer compound is a polyhydric alcohol acrylate monomer compound containing an unsaturated double bond.

4. The cured photoresist of claim 3, wherein the ratio of the monomer compound with the secondary amine group to the acrylic monomer compound is from 1:99 to 80:20.

5. The cured photoresist of claim 3, wherein the ratio of the monomer compound with the secondary amine group to the acrylic monomer compound is substantially 10:90.

6. A resin composition, wherein the resin composition comprises an initiator, at least one multifunctional monomer, a resin, a solvent, and an agent, wherein the multifunctional monomer comprises a monomer compound with a secondary amine group;
wherein, the monomer compound with the secondary amine group is one or a combination of amide diene, secondary amine diene, secondary amine acrylate, acrylic monomer compound containing socyanate.

7. The resin composition of claim 6, wherein the monomer compound with the secondary amine group is amide diene.

8. The resin composition of claim 6, wherein the multifunctional monomer further comprises an acrylic monomer compound, and the acrylic monomer compound is a polyhydric alcohol acrylate monomer compound containing an unsaturated double bond.

9. The resin composition of claim 8, wherein the ratio of the monomer compound with the secondary amine group and the acrylic monomer compound is 1:99-80:20.

10. The resin composition of claim 8, wherein the ratio of the monomer compound with a secondary amine group and the acrylic monomer compound is 10:90.

11. The resin composition of claim 6, wherein the total weight of the solid content of the resin composition is 100 wt %, the content of the multifunctional monomer is 3-16 wt %.

12. The resin composition of claim 6, the content of the initiator is 0.5-4 wt %, the content of the resin is 3-16 wt %, and the content of the solvent is 50-90 wt %, and the content of the agent is 0.3-2 wt %.

13. A display panel, wherein the display panel comprises a cured photoresist, the cured photoresist is formed by curing a resin composition with light at low temperature; wherein the resin composition comprises an initiator, at least one multifunctional monomer, a resin, a solvent, and an agent; wherein the multifunctional monomer comprises a monomer compound having a secondary amine group;
wherein, the monomer compound with the secondary amine group is one or a combination of an amide diene, a secondary amine diene, a secondary amine acrylate, and an acrylic monomer compound containing an isocyanate.

14. The display panel of claim 13, wherein the monomer compound with the secondary amine group is amide diene.

15. The display panel of claim 13, wherein the multifunctional monomer further comprises an acrylic monomer compound, and the acrylic monomer compound is a polyhydric alcohol acrylate monomer compound containing an unsaturated double bond.

16. The display panel of claim 15, wherein the ratio of the monomer compound with the secondary amine group to the acrylic monomer compound is 1:99-80:20.

17. The display panel of claim 15, wherein the ratio of the monomer compound with the secondary amine group to the acrylic monomer compound is 10:90.

* * * * *